United States Patent
Voehringer et al.

[19]

[11] Patent Number: 6,078,153
[45] Date of Patent: Jun. 20, 2000

[54] DEVICE FOR OPERATING AN ADJUSTING DRIVE

[75] Inventors: Klaus Voehringer, Berliner; Guenter Haderer, Bühl, both of Germany

[73] Assignee: Robert Bosch GmbH, Stuttgart, Germany

[21] Appl. No.: 09/171,321

[22] PCT Filed: Mar. 7, 1997

[86] PCT No.: PCT/DE97/00452

§ 371 Date: Jan. 28, 1999

§ 102(e) Date: Jan. 28, 1999

[87] PCT Pub. No.: WO97/39216

PCT Pub. Date: Oct. 23, 1997

[30] Foreign Application Priority Data

Apr. 17, 1996 [DE] Germany .......................... 196 15 125

[51] Int. Cl.⁷ ................................. H02P 5/04; H02P 7/00
[52] U.S. Cl. ........................... 318/266; 318/286; 318/283
[58] Field of Search .................... 318/245–293, 318/440–468, 469; 187/800–900; 296/210, 221; 49/26, 28, 43, 138

[56] References Cited

U.S. PATENT DOCUMENTS

| | | |
|---|---|---|
| 4,328,540 | 5/1982 | Matsuoka et al. . |
| 4,498,033 | 2/1985 | Aihara et al. . |
| 4,515,246 | 5/1985 | Kajiyama et al. ..................... 187/29 R |
| 4,767,974 | 8/1988 | Kadosawa ............................ 318/663 |
| 4,900,994 | 2/1990 | Mizuta ................................. 318/283 |
| 5,278,480 | 1/1994 | Murray . |
| 5,637,969 | 6/1997 | Kato et al. ............................ 318/432 |
| 5,764,008 | 6/1998 | Hahn et al. ........................... 318/256 |

FOREIGN PATENT DOCUMENTS

| | | |
|---|---|---|
| 0 083 947 | 1/1983 | European Pat. Off. . |
| 2039080 | 7/1980 | United Kingdom . |
| 2 189 906 | 11/1987 | United Kingdom . |

*Primary Examiner*—Paul Ip
*Attorney, Agent, or Firm*—Kenyon & Kenyon

[57] ABSTRACT

An apparatus for operating a positioning drive is proposed, in which a distance between two predefined positions is ascertained in the course of a reference run, and is used as the basis for a data set selection.

11 Claims, 2 Drawing Sheets

DEVICE FOR OPERATING AN ADJUSTING DRIVE

FIELD OF THE INVENTION

This application is a 371 of PCT/DE97/00452 filed on Mar. 7, 1997.

The present inventions relates to an apparatus for operating a positioning drive.

BACKGROUND INFORMATION

Conventional systems parameterize positioning drives as a function of a previously known load. The parameters of the positioning drive may include specific positions at which the positioning drive is to arrive. Different parameter sets serve to adjust the respective monitoring criteria to the different load situations. Parameterization of the positioning drive occurs, depending on the intended application, prior to assembly.

SUMMARY OF THE INVENTION

An apparatus for operating a positioning drive according to the present invention has the advantage that parameterization of the positioning drive can occur after assembly. A reference run automatically ascertains the application for which the particular positioning drive is provided. The apparatus thereupon automatically selects the appropriate parameter set. The apparatus according to the present invention contributes to a reduction in variants, since now one and the same apparatus can be assembled in different applications. The different parameter sets then cover the various load instances.

The apparatus for operating a positioning drive according to the present invention may be used in positioning drives for power windows and sun roofs.

DETAILED DESCRIPTION

Figure 1:
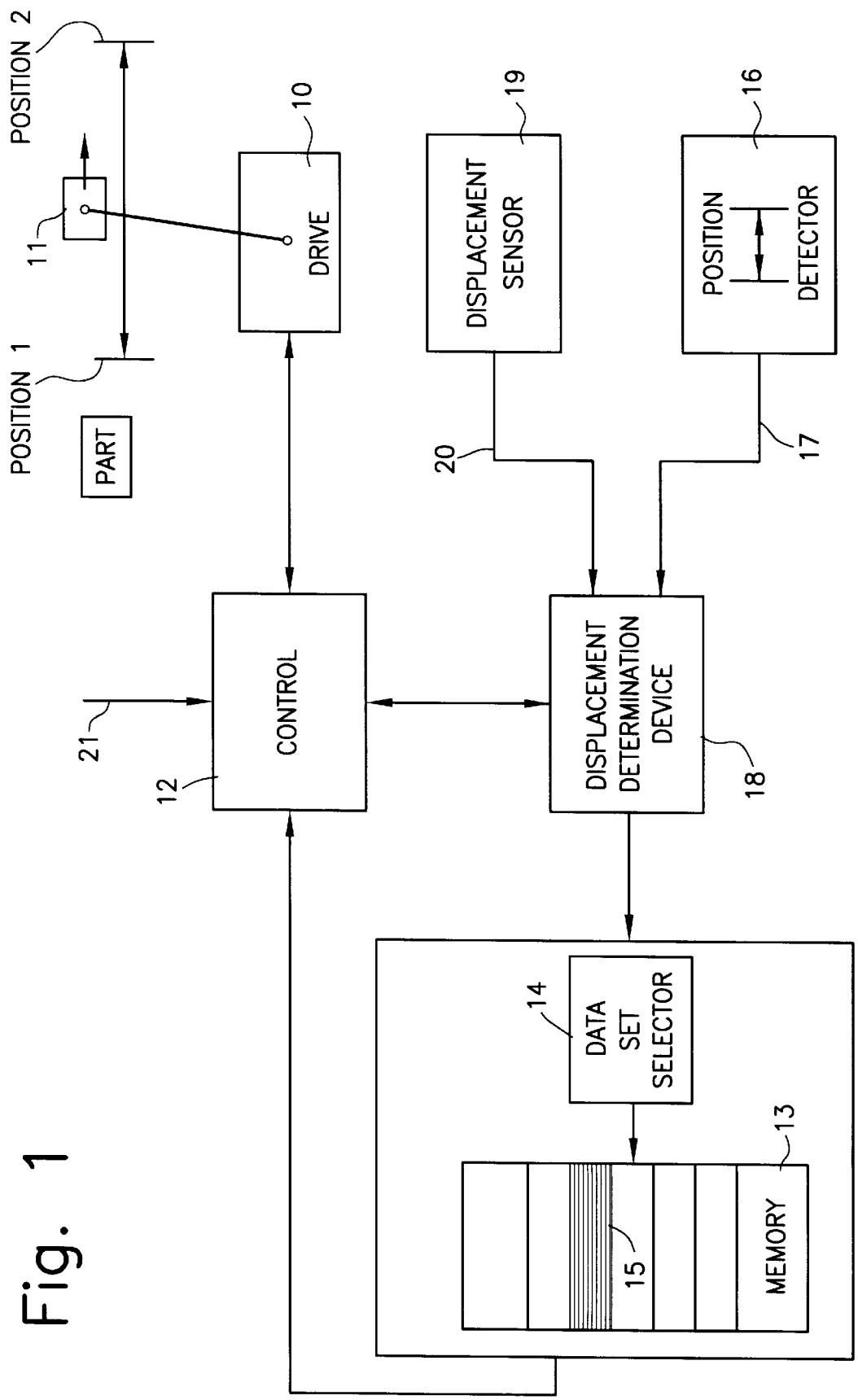
FIG. 1 illustrates an exemplary embodiment of the present invention.

A positioning drive 10 moves a part 11 which can be shifted at least between a position 1 and a position 2. A displacement sensor 19 generates displacement signals 20 which, like position signals 17 generated by a position detector 16, are delivered to a displacement determination device 18. Displacement determination device 18 exchanges signals with a control arrangement 12. Displacement determination device 18 makes available to a data set selector 14 signals with which data set selector 14 selects one data set 15 from various data sets stored in a memory 13, and delivers it to control arrangement 12. After receiving the "start reference run" signal 21, control arrangement 12 starts a reference run.

Figure 2:
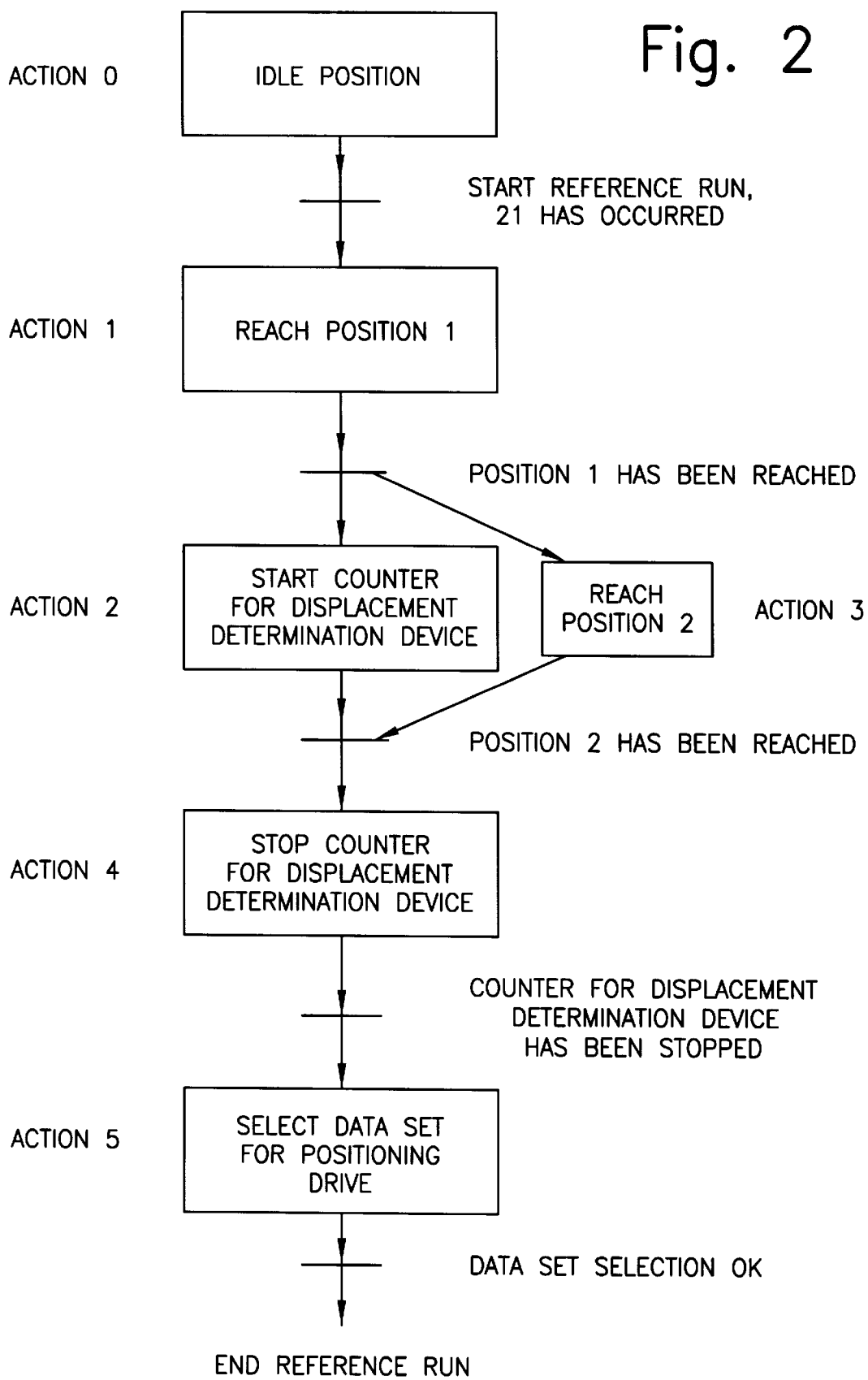
FIG. 2 illustrates a flow chart of an exemplary reference run.

FIG. 2 describes one possibility for carrying out the reference run. Starting from action 0, the idle position, action 1 is initiated after actuation of the "start reference run" signal 21. Position 1 is thereby reached. Once position 1 has been reached, the counter for displacement determination device 18 is started (action 2), and the instruction is given to reach position 2 (action 3). Once position 2 has been reached, in action 4 the counter for displacement determination device 18 is stopped. Then, in action 5, a data set selection 14 is performed for positioning drive 10. After data set selection 14, the end of the reference run has been reached.

The arrangements shown in FIGS. 1 and 2 operate as follows:

The apparatus is in the idle position (action 0); part 11 may be in any position. Memory 13 contains a variety of data sets, none of which have yet been reported to control arrangement 12 as being relevant. The reference run is initiated via the "start reference run" signal 21. The signal could, for example, be generated during the first actuation of positioning drive 10.

During action 1, control arrangement 12 must send control signals to positioning drive 10 in order to reach position 1. It is conceivable in this context for positioning drive 10 to move part 11 at a predefined rotation speed in a predefined direction. For example, assume that positioning drive 10 will first move part 11 to the right as shown in FIG. 1. If the initial position of part 11 is to the right of position 1, part 11 will first reach position 2. Position detector 16 thereupon delivers position signals 17 to displacement determination device 18 and to control arrangement 12, informing control arrangement 12 that position 2 has been reached.

Position signals 17 can be generated, for example, via switches or microswitches whose output signal changes as soon as part 11 reaches the position equipped with the switch. It is also conceivable, if an electric motor is present in positioning drive 10, to utilize the armature current profile or the change over time in the armature current for position analysis. If, for example, a position is embodied as a mechanical end stop, the armature current will then rise as a result of the jamming situation. If specific limits are thereby exceeded, position detector 16 delivers position signals 17 which indicate that the mechanical end stop has been reached. The end stop can also be detected via a rotation speed analyzer if the rotation speed of positioning drive 10 has assumed a value of zero for a specific time interval. Also conceivable is a combination of the position determination possibilities just described, for example an analysis of switch signals together with detection of mechanical end stops.

In action 1, part 11 has arrived at position 2. Control arrangement 12 thereupon authorizes a reversal in the rotation direction of positioning drive 10. Part 11 now moves to the left and ultimately reaches position 1, which position signals 17 report to displacement determination device 18 and control arrangement 12.

If part 11 is located to the left of position 1 in the initial position, position 1 is reached without a reversal in rotation direction, with the predefined movement to the right. The condition necessary for actions 2 and 3 is thus met.

In the context of action 2, the counter for displacement determination device 18 is started. For example, displacement sensor 19 delivers incremental displacement signals 20 to the counter of displacement determination device 18. Incremental displacement signals 20 can, for example, be generated by a Hall sensor. The counter counts the pulses of the Hall sensor until it is stopped. It is also possible to constitute incremental displacement signals 20 from the ripple of the armature current of the electric motor. The number of extremes of the rippled armature current is an indication of the displacement traveled.

Action 3 proceeds concurrently with action 2. Control arrangement 12 as shown in FIG. 1 issues to positioning drive 10 the instruction to shift part 11 to the right at a specific speed.

Once position 2 has been reached, the counter for the displacement determination device is stopped. Once this has happened, data set selection 14 then occurs in action 5. The counter status is an indication of the distance between position 1 and position 2. Using the distance thus determined, it is possible, for example, to recognize a specific model of sun roof. For each model of sun roof, the spacings between position 1 and position 2 are known, as are the loads which occur for positioning drive 10 as a function of the model. Parameter sets for specific sun roofs are stored in memory 13 as a function of distance. Data set selector 14 applies an expanding tolerance band to the distance that is ascertained. Data set selector 14 then searches for that data set 15 whose distance lies within the range determined. This data set 15 supplies control arrangement 12 with, for example, information about specific positions or load-dependent limit values. The reference run is thus complete, and positioning drive 10 is parameterized with data set 15.

What is claimed is:

1. An apparatus for operating a positioning drive, comprising:
   a shiftable part, the positioning drive positioning the shiftable part;
   a position detector generating position signals;
   a displacement sensor generating displacement signals;
   a displacement determination device determining a distance between at least two predetermined positions of the shiftable part as a function of the position signals and the displacement signals;
   a data set selector selecting a data set from a plurality of data sets stored in a memory as a function of the determined distance; and
   a control arrangement transmitting switching signals as a function of the selected data set to the positioning drive.

2. The apparatus according to claim 1, wherein the control arrangement transmits switching signals as a function of a reference run to the positioning drive.

3. The apparatus according to claim 1, where at least one of the at least two predetermined positions of the shiftable part is a mechanical stop, the mechanical stop being detected by the position detector via an analysis of at least one of an armature current and a rotation speed of an electric motor arranged in the positioning drive.

4. The apparatus according to claim 1, wherein at least one of the at least one predefined positions is detected by the position detector via a switch.

5. The apparatus according to claim 1, wherein the displacement sensor transmits incremental displacement signals.

6. The apparatus according to claim 5, wherein the incremental displacement signals include signals from a Hall sensor.

7. The apparatus according to claim 5, wherein the incremental displacement signals include signals representing a ripple of an armature current of an electric motor, the electric motor being arranged in the positioning device.

8. The apparatus according to claim 1, wherein the displacement determination device includes a counter.

9. The apparatus according to claim 1, wherein the shiftable device includes a sun roof.

10. The apparatus according to claim 1, wherein the shiftable device includes a power window.

11. The apparatus according to claim 1, wherein each data set of the plurality of data sets is at least one of a specific position data set and a load-dependent limit value data set.

* * * * *